(12) United States Patent
Gebert et al.

(10) Patent No.: US 6,585,894 B1
(45) Date of Patent: Jul. 1, 2003

(54) RING-SHAPED FILTER ELEMENT INCLUDING AN ANNULAR END PLATE AND A FOAMED ELASTIC SEALING RING

(75) Inventors: Hans Gebert, Heilbronn (DE); Horst Schneider, Waiblingen (DE); Hans Waibel, Remseck/Aldingen (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 09/710,307

(22) Filed: Nov. 9, 2000

Related U.S. Application Data

(63) Continuation-in-part of application No. 09/646,682, filed as application No. PCT/DE99/00671 on Mar. 12, 1999, now abandoned.

(30) Foreign Application Priority Data

Mar. 26, 1998 (DE) ............................. 198 13 320

(51) Int. Cl.$^7$ ................................ B01D 27/06
(52) U.S. Cl. ....................... 210/493.2; 210/450
(58) Field of Search .................. 210/450, 493.1, 210/493.2, 493.3, 493.5; 55/502, 521

(56) References Cited

U.S. PATENT DOCUMENTS

| | | | | |
|---|---|---|---|---|
| 3,235,633 A | * | 2/1966 | Holloway et al. | 264/257 |
| 3,423,909 A | * | 1/1969 | Bennett et al. | 55/498 |
| 4,128,251 A | * | 12/1978 | Gaither et al. | 277/644 |
| 5,556,542 A | | 9/1996 | Berman et al. | |
| 5,741,421 A | | 4/1998 | Erdmannsdoerfer et al. | |
| 6,159,261 A | * | 12/2000 | Binder et al. | 55/498 |

FOREIGN PATENT DOCUMENTS

| | | |
|---|---|---|
| DE | 39 18 342 | 6/1990 |
| DE | 44 16 577 | 11/1994 |
| DE | 93 20 639 | 12/1994 |
| DE | 44 28 139 | 10/1996 |
| DE | 195 41 385 | 5/1997 |
| DE | 44 41 608 | 7/1997 |
| EP | 0 314 915 | 9/1988 |
| EP | 0 559 011 | 9/1993 |
| EP | 0 650 751 | 5/1995 |
| EP | 0 773 052 | 5/1997 |
| EP | 0 781 586 | 7/1997 |
| GB | 2048109 A | * 12/1980 |
| WO | 97/41939 | 11/1997 |

* cited by examiner

Primary Examiner—Matthew O. Savage
(74) Attorney, Agent, or Firm—Collard & Roe, P.C.

(57) ABSTRACT

A ring-shaped filter element through which material can flow radially. Web material as is provided filter material which is folded in a zigzag shape and sealingly connected at its longitudinal sides relative to a ring-shaped end plate. The end plate is formed of a first area made of a first material, and extends peripherally and not covering a radial inner and/or outer edge area. A second area forms this edge area and is designed for a seal-tight placement onto a connecting part, of a second material. The ring-shaped filter element contains a second area having a second material which is foamed simultaneously onto the web material of the first material already connected fixedly with the web material.

5 Claims, 3 Drawing Sheets

RING-SHAPED FILTER ELEMENT INCLUDING AN ANNULAR END PLATE AND A FOAMED ELASTIC SEALING RING

CROSS REFERENCE TO RELATED APPLICATION

This is a Continuation-in-Part of U.S. patent application Ser. No. 09/646,682 filed on Nov. 7, 2000, now abandoned, which is a 371 of PCT/DE99/00671 filed on Mar. 12, 1999.

BACKGROUND OF THE INVENTION

1. Field of the Invention

The invention relates to a ring-shaped filter through which material can flow radially. More specifically, the invention relates to a filter element made of a web material that is folded in a zigzag shape, and this filter element is sealingly connected to a ring-shaped end plate.

2. The Prior Art

A material, similar to the material used for the sealing edge of the filter element of the present invention, has been disclosed in EP 0 559 011 A1 and DE 44 41 608 A1 for the manufacture of an end plate of a filter element. A disadvantage of these known references is the entire end plate is comprised of the material, and there is no complete material separation between the embodied areas. In EP 0 599 011 A, the sealing edge area is reinforced by the introduction of additional material to provide a satisfactory sealing action. The same is shown in DE 44 41 608 A1 since the entire end plate is made of the same basic material that is provided in the radially sealing area. In addition, the material can be softened, then hardened, thereby exhibiting elastic properties.

In a filter element according to EP 0 773 052 A1, an elastic sealing material made of a non-woven material is used as a sealing edge in the filter end plate. To function satisfactorily as a seal, it must be chambered by adjacently positioned, relatively rigid end plate material or applied in multiple layers welded to one another. In addition, the manufacturing method disclosed in this reference is complicated, and the sealing edge is not safe.

Moreover, WO 97/41939 discloses end plates of a ring-shaped filter. However, instead of using a formed sealing material, a material is provided which must be connected, either as a sealing ring in the pre-fabricated state to the end plate, or must be provided with the required elasticity by a spring means.

EP 0 559 011 A1 describes ring filter elements in which the end plates are comprised of a non-woven material, at least in those areas where a sealing action is to be provided.

SUMMARY OF THE INVENTION

It is an object of the present invention to provide an end face radial sealing edge that is placed tightly on a connecting part. In addition, the present invention provides an economical and safe filter material cover at the end face. Ring filter elements are used in filters for fuel and lubricants in internal combustion engines of vehicles.

These and other objects are accomplished by providing a ring filter element having at least one end plate forming a first area made of a first material. The first area extends peripherally so as not to cover the radial inner and/or outer edge area. A second area forms the edge areas to provide a seal-tight placement onto a connecting part. The second area is made of a second material different from the first material.

The invention also relates to the method for manufacturing such a filter element.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1A:
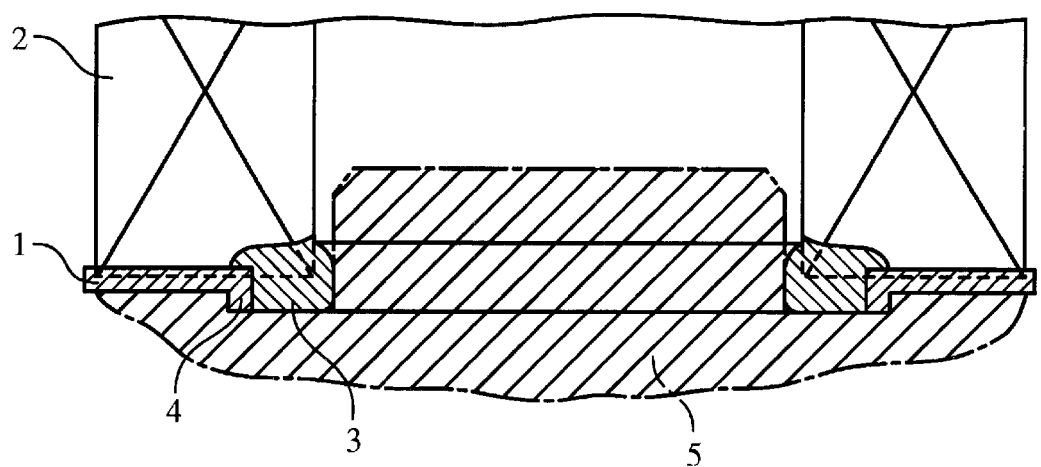
FIGS. 1A–1C show cross sectional views end plates connected to filter material and manufacturing molds indicated by broken lines.
Figure 1B:
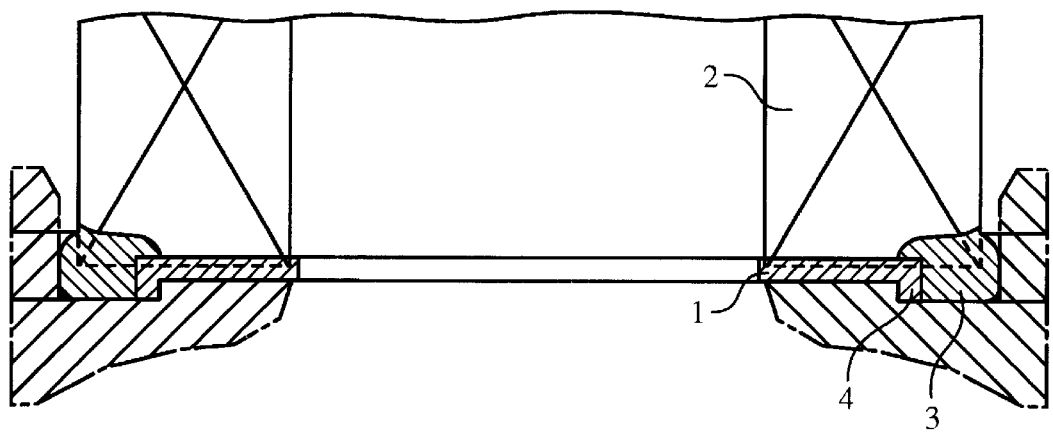
Figure 1C:
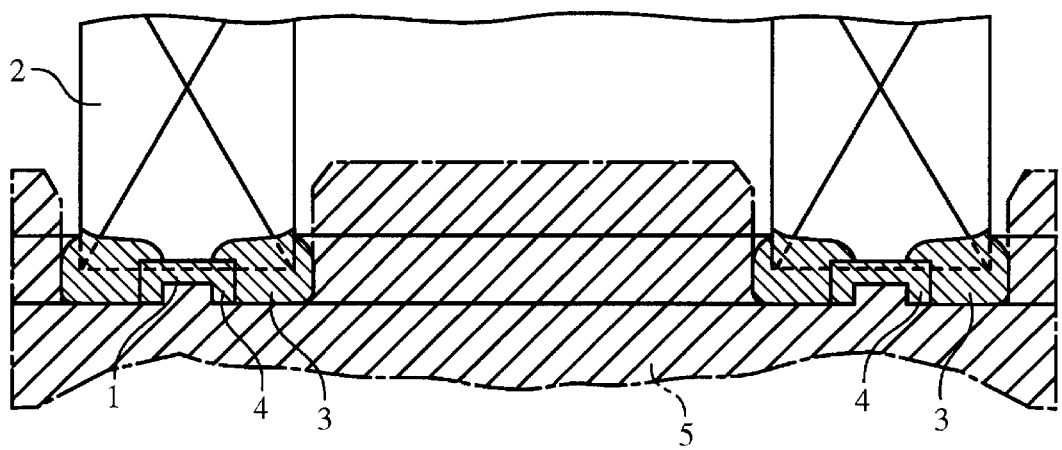

Referring now in detail to the drawings and, in particular, FIG. 1A–C there is shown a filter web material 2 with folded longitudinal sides and which is embedded in a sealing fashion into an end plate 1 of a relatively rigid plastic material. Filter web material 2 can be made of paper. A sealing ring 3 is formed radially inwardly and/or outwardly on end plate 1 and on filter web material 2.

End plate 1 is recessed radially inward and/or outwardly relative to the inner periphery of filter web material 2 so that sealing ring 3 axially covers the area of filter web material 2 which is not axially covered by end plate 1. The material of sealing ring 3 is sealingly connected with the inner peripheral area of end plate 1 and with adjoining filter web material 2. The material of sealing ring 3 slightly projects into the folded filter web material 2 so that a fixed and tight connection of sealing ring 3 to filter web material 2 is guaranteed.

End plate 1 has an axially projecting annular collar 4 at sealing ring 3. This annular collar 4 makes it possible to use a sealing ring 3 having a sufficient axial height and, simultaneously, provide radial support across this height. In this way, it is possible to provide radial compression of sealing ring 3 relative to a cylindrical counter surface. Therefore, the sealing action is achieved, even after an extended period of time.

Figure 2A:
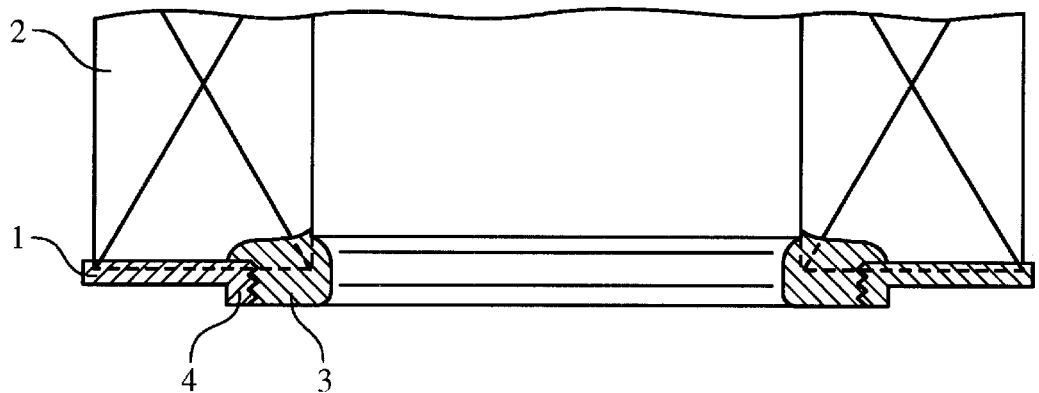
FIGS. 2A–2C show cross sectional views of other embodiments according to the invention.
Figure 2B:
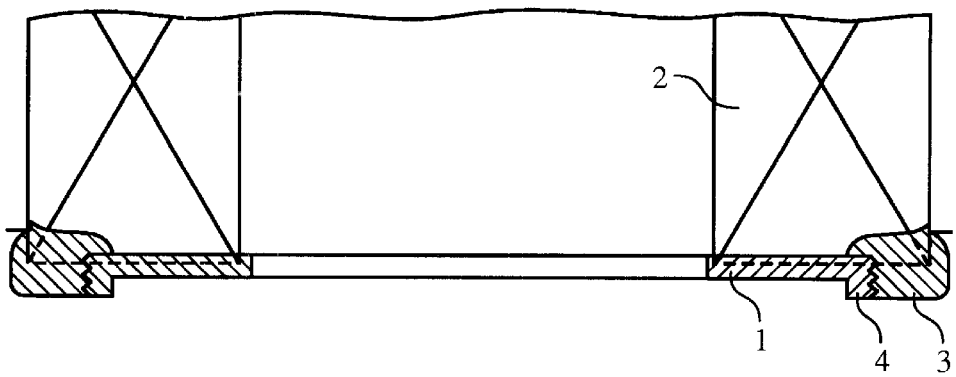
Figure 2C:
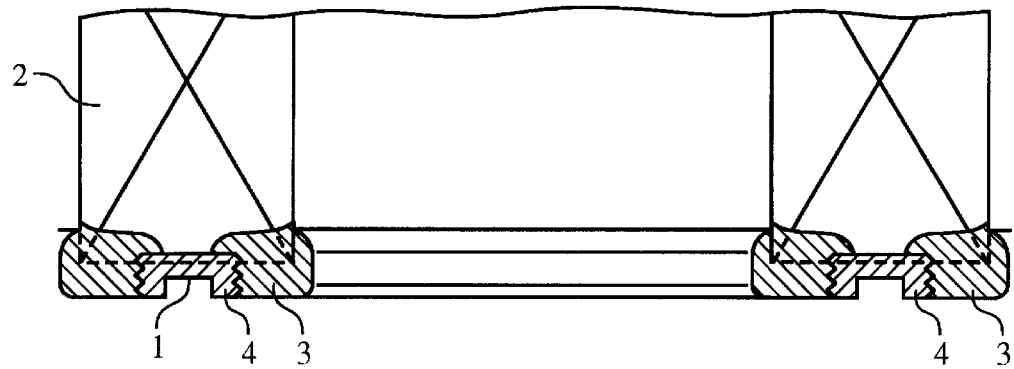

For the purpose of improved hold, the radial contact surface of annular collar 4 for sealing ring 3 can be roughened, ribbed or, for example, fluted as indicated in FIGS. 2A–C.

In a preferred embodiment, sealing ring 3 is made of nitrile rubber. Nitrile rubber is a material which is introduced in a relatively deformable state into the designated area of filter web material 2 and end plate 1. It is then softened by heat and then hardened to an elastic, permanently effective sealing material. In the softened state, the sealing material can flow so that it penetrates filter web material 2, i.e., into the interstitial fold spaces of filter web material 2, and is then hardened.

A method for forming a sealing ring 3 simultaneously on the radial periphery of an end plate 1 and on filter web material 2 is performed in the following manner.

A filter web material 2, folded in a zigzag shape and shaped to form a ring, is tightly formed into a plastic end plate 1. For the forming process, the end plate material is plasticized, i.e., transformed into a plastic state by heating. End plate 1 leaves a radially inwardly positioned end face area of the filter web material uncovered. In this state, the filter element is inserted along with end plate 1 into a manufacturing mold 5. Prior to this, a blank for producing the sealing ring 3 has already been inserted into this mold 5. This blank is comprised of the material nitrile rubber and has overall dimensions relative to mold 5, filter web material 2 as well as end plate 1. The nitrile rubber contains a blowing or forming agent which causes raw material to foam when subjected to heat. To achieve this foaming, mold 5 is heated. The raw material for sealing ring 3 foams within mold 5, which has been machined to the shape of sealing ring 3. The foaming raw material of sealing ring 3 penetrates into the folds of filter web material 2 and thereby bonds tightly with the filter web material. The axial penetration depth of the sealing ring material into the fold spaces depends on the pre-adjustable foaming capacity of the sealing ring raw material.

Figure 3A:
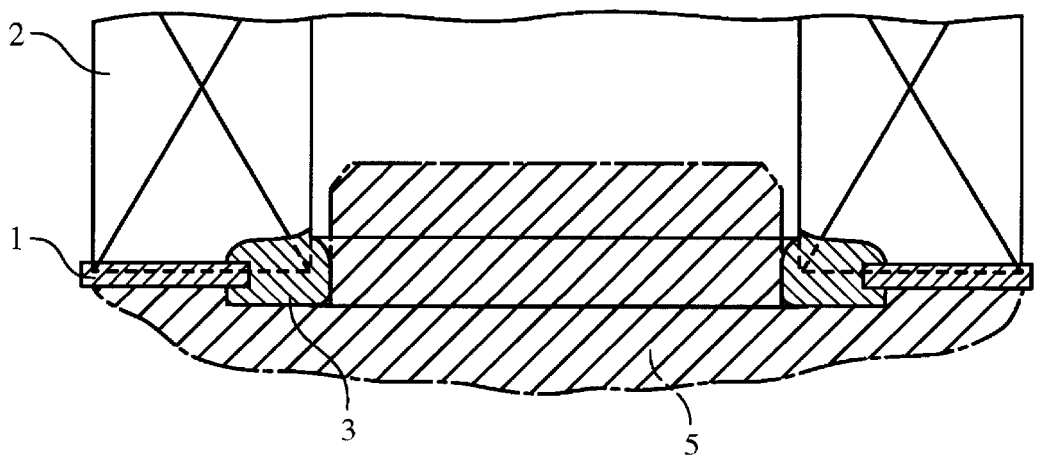
FIGS. 3A–3C show a cross sectional views of end plates in FIGS. 1A–1C in which the edge areas are comprised of a non-woven material.
Figure 3B:
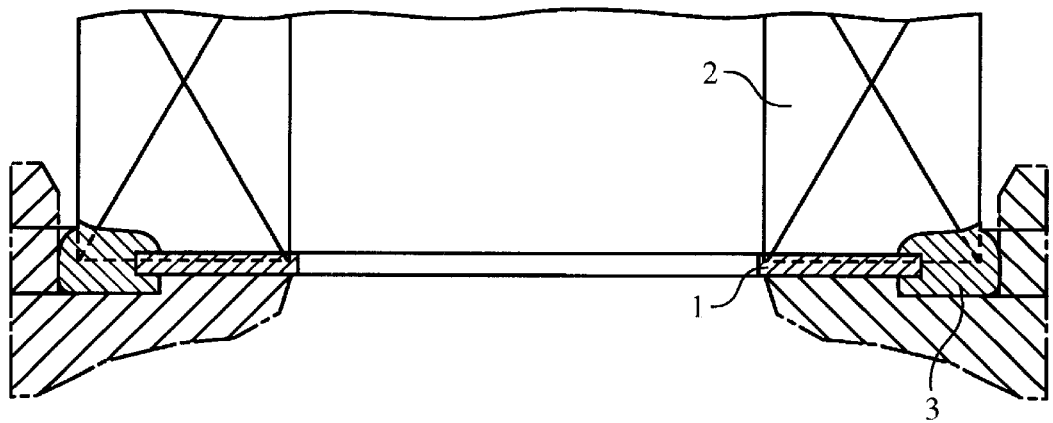
Figure 3C:
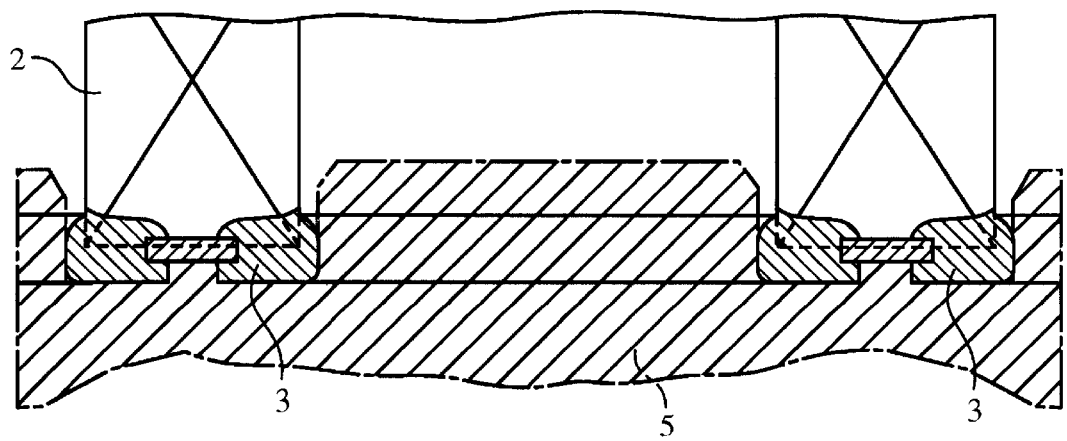

FIGS. 3A–C shows an embodiment having end plate 1 comprised of a foil-shaped non-woven material, being fixedly connected to the end face edges of the web material. The foil-shaped non-woven material can be applied to the end face edges of the filter web material, for example, by ultrasound welding. With such a connection, the non-woven material is present in a relatively rigid form.

In a preferred embodiment, ethylene acrylate rubber (AEM) is used as the sealing material since it has especially beneficial properties.

Accordingly, while only a few embodiments of the present invention have been shown and described, it is obvious that many changes and modifications may be made thereunto without departing from the spirit and scope of the invention.

What is claimed is:

1. A ring-shaped filter element through which material can flow radially, comprising:

at least one annular end plate comprising:

a first annular area of a first material extending peripherally and not covering a radial inner and/or outer edge area of said end plate;

a second annular area forming only the radially inner and/or outer edge area designed for seal-tight placement onto a connecting part, said second area formed of a second foamed material that is more elastic than said first material; and a web filter material folded in a zig zag shape and sealingly connected at one end thereof to said end plate at said first area, wherein said second material is foamed simultaneously onto the web material and the first area to which the web material is connected.

2. The filter element according to claim 1, wherein said first material, in an area of contact with said second material, is formed as an annular collar axially projecting past the area of first material.

3. The filter element according to claim 1, wherein said first material is a non-woven material.

4. The filter material according to claim 3, wherein said second material is comprised of a base material that can be softened and then hardened, thereby maintaining elastic properties in its hardened state.

5. The filter according to claim 1, wherein said second material is comprised of a base material that can be softened and then hardened, thereby maintaining elastic properties in its hardened state.

* * * * *